United States Patent [19]

Guenthner

[11] 4,243,401

[45] Jan. 6, 1981

[54] APPARATUS FOR PRODUCING DOUBLE-WALLED HEAT INSULATING CONTAINERS

[75] Inventor: Franz Guenthner, Mainz, Fed. Rep. of Germany

[73] Assignee: Jenaer Glaswerk Schott & Gen., Fed. Rep. of Germany

[21] Appl. No.: 31,188

[22] Filed: Apr. 18, 1979

[30] Foreign Application Priority Data

Apr. 26, 1978 [DE] Fed. Rep. of Germany ....... 2818259

[51] Int. Cl.³ ............................................. C03B 23/13
[52] U.S. Cl. ......................................... 65/153; 65/54; 65/55; 65/56; 65/109
[58] Field of Search ...................... 65/54, 55, 56, 109, 65/153

[56] References Cited

U.S. PATENT DOCUMENTS

| | | | |
|---|---|---|---|
| 1,156,971 | 10/1915 | Burrows | 65/153 |
| 1,735,027 | 11/1929 | Wetmore | 65/153 |
| 1,755,307 | 4/1930 | Rohl | 65/153 X |
| 2,593,999 | 4/1952 | Eisler | 65/153 |
| 2,805,787 | 9/1957 | Sherman | 220/15 |

FOREIGN PATENT DOCUMENTS 769476 6/1934 France ....................................... 65/153

*Primary Examiner*—Arthur D. Kellogg
*Attorney, Agent, or Firm*—Hill, Van Santen, Steadman, Chiara & Simpson

[57] ABSTRACT

Inner and outer blow-moulded glass bulbs, each open at one end thereof, are positioned one inside another on an apparatus having a chuck means which holds the bulbs in a spaced apart relation. The apparatus includes pivotally moveable gripping means which engage outer surface edges of the outer bulb along the open end thereof and positively hold such surface edges against an adjacent support surface while deformation heat and force are applied to the outer bulb surfaces above such edges to selectively compress or stretch such outer bulb surfaces toward the adjacent inner bulb surfaces. Thereafter, the surfaces of the inner and outer bulbs which are in contact with one another are fused together and the open ends of the respective bulbs are sealed to one another to define a container mouth.

9 Claims, 8 Drawing Figures

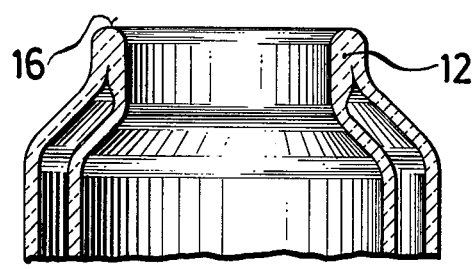
FIG. 6
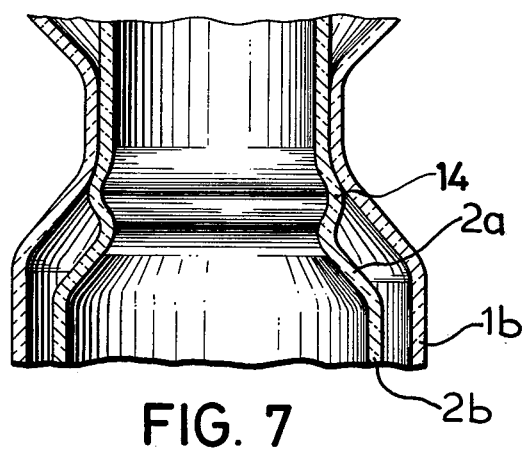
FIG. 7
FIG. 8
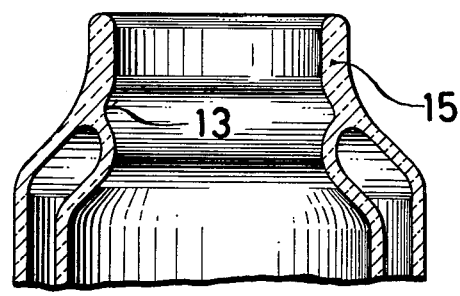

APPARATUS FOR PRODUCING DOUBLE-WALLED HEAT INSULATING CONTAINERS

BACKGROUND OF THE INVENTION

1. Field of the Invention

The invention relates to a double-walled heat insulating containers and somewhat more particularly to a process and apparatus for producing double-walled heat insulating containers.

2. Prior Art

Glass double-walled heat insulating containers, such as for heat-retaining flasks and/or ice-containing flasks are still partly mouth-blown. Such production procedures are very costly and inconvenient.

Processes for producing double-walled insulating containers via machines are also known. In such processes, an inner bulb and an outer bulb are blown separately from each other and stress-relieved. Open end portions of the bulbs are then cut-off separately. Further processing is determined by whether a wide-mouth or a narrow-mouth container is desired. When producing an insulating container with a wide-mouth, the lip of the inner bulb open end is flanged, the bulbs placed one inside the other and maintained in the required mutual disposition via a separate support means. The outer bulb is then constricted at its open end and fused with the open end of the inner bulb. The outer bulb being previously provided with a pump spigot to enable evacuation of the space between the bulbs.

Such machine processes are limited to production of wide-mouth insulating containers since the open end of the outer bulb can only be constricted a limited amount. The glass of such a bulb has to be brought to a high temperature, producing a low viscosity, in order to allow the constricting operation to take place. The greater the degree of constriction required, the larger must be the low viscosity range of the glass and the longer its plastic or deformable state must be maintained. With the low viscosities which are thus encountered, surface tension forces occurring in the glass cause it to contract in order to assume a smaller surface area and consequently the glass changes dimensionally. In the radial direction, it is possible to counter this change by using centrifugal force applied via rotation of the glass. On the other hand, in the longitudinal direction, there is no way of counteracting the surface tension effects so that the open end of the outer bulb is subject to shrinkage in that direction.

Additionally, the wall thicknesses inevitably vary from bulb to bulb and this in itself means that a uniform and time-constant shrinkage pattern is unattainable and the result is dimensional variations in the ultimate containers. In view of these irregularities, it is necessary to limit the amount of constriction of the outer bulb, thereby limiting very considerably the possibility of changing container shapes.

Since narrow-mouth insulating containers require the open end of the outer bulb to be left wide at the beginning of the process in order to allow the insertion of the inner bulb therein, a relatively marked subsequent constriction of the outer bulb is necessary. However, this is not possible with the process described above so that its application to the production of narrow-mouth insulating containers is completely excluded. A prior art solution to this problem has been to blow the mouth of the outer bulb to its final dimension, cut the outer bulb in half and then fuse the so-cut halves together around the inner bulb. However, both known processes variations are costly and inconvenient and result in qualitatively poor fusing.

SUMMARY OF THE INVENTION

The invention provides a process and apparatus for producing double-walled heat insulating containers which can be used regardless of the desired mouth width of the finished article and which will produce qualitatively good fusing with a substantially uniform wall thickness and which, nevertheless, remains simple and cost-effective, with the number of operations required to attain a finish product being kept to a minimum.

In accordance with the principles of the invention, a blow-moulded inner bulb is positioned within a blow-moulded outer bulb, with the bulbs being maintained in a spaced-apart relation while outer surface edges of the outer bulb around the open end thereof are positively maintained in position and deformation heat and force are applied to the outer bulb surface above such edges to selectively compress or stretch the outer bulb surfaces toward the adjacent inner bulb surfaces. Thereafter, the surfaces of the inner and outer bulbs which are in contact with one another are fused together and the open ends of the respective bulbs are sealed to one another to define a container mouth. In this manner a uniform wall-thickness in the region of the constriction is readily attained.

By utilizing the principles of the invention, the inner and outer bulbs can be so-formed that, after leaving the blowing machine, they can be inserted one inside the other without an additional parting operation. The inner bulb can thus be formed into its final shape during blowing and it is preferably placed with the open end portion thereof on a mounting means which supports it or is placed on an expanding mandrel means projecting inside the inner bulb, which maintains the inner bulb in position. The outer bulb can be clamped in a vacuum or a mechanical clamping means so as to maintain the desired relation thereof with the inner bulb. A gripping means can be clamped onto the edges about the open end of the outer bulb so that select surface portions of the outer bulb can be stretched or compressed without changing the distance between the bases of the inner and outer bulbs.

During constriction of a glass bulb, the average wall thickness of such bulb will only remain unchanged under very special conditions during the forming stage thereof and in accordance with the principles of the invention this particular feature of glass is utilized to advantage in most instances. Nevertheless, there are some instances in which this procedure is not necessary. As an example, given a cylinder jacket of height h and pitch circle radius r, then a corresponding taper jacket of the same pitch circle radius and the same height will have the same jacket surface area, providing that $h = 0.577\ r$. In that instance, the cylinder can be theoretically transformed without modifying the height into a taper of similar wall thickness.

An apparatus embodiment of the invention comprises a first clamping chuck means for supporting an inner bulb with a support surface for the open end edges of such bulb and an expandable mandrel means axially moveable through a bore in such support surface to engage inner surface areas of the inner bulb; a second clamping chuck means for supporting an outer bulb and having a support surface for the open end edges of such bulb arranged concentrically with the first chuck support surface, gripping means pivotally moveable toward the second chuck support surface for positively gripping outer edges of the outer bulb adjacent the open end edges thereof against such second chuck support surface; a third clamping chuck means for supporting the outer bulb on the oposite end from its open end, the third chuck means being located coaxially with and spaced apart from the first and second chuck means; and a deforming-heating means located between the third and the first and second chuck means selectively moveable toward and away from the first and second chuck means. In certain embodiments of this apparatus, a forming tool can be located between the third and the first and second chuck means and is selectively moveable toward and away from the first and second chuck means to engage surface portions of the outer bulb above and adjacent the open end thereof.

In accordance with the principles of the invention after clamping both bulbs, the section of the outer bulb to be constricted can be heated and constricted with or without the use of tooling. When used, the tooling is generally a forming roll, although it may also be a profiled section. Heating can be by means of an electric radiant heating means or by a gas-burner or other heat source, although a gas-burner is normally used. The burner and the forming roll may be moved along and in the direction of the longitudinal axis of the outer bulb during the heating and forming operation. The heating arrangement and the forming tool may consist of several components, moving together or separately.

The heating operation is effected in such a manner that the inner bulb is not deformed at the constriction area, but is brought to a temperature which allows fusion thereof with the glass of the outer bulb. Air can be blown-in to effect cooling of the inner bulb. The constriction of the outer bulb can be accelerated by evacuating the space (i.e., providing sub-atmospheric pressure in such space) between the outer and inner bulbs and/or by rotating both bulbs while they are stabilized about their respective axes. The hot glass portions of the respective bulbs are fused together immediately after constriction at the parting line which defines the ultimate container mouth. The joint melting or fusion of the inner and outer bulbs has the advantage that a stable, impact-resisting and smooth rim is formed and on which a pouring lip or spout can be formed, if desired.

Individual parameters, such as heating, forming tool movement, glass component rotation speed, thermal capacity, evacuation or blowing and drawing or upsetting are related to each other in accordance with the nature of the container to be produced and such relations are well known to those skilled in the art so that further details thereof are not set forth herein.

It is preferable, although not essential, that both glass bulbs be connected at a constriction area or region which extends over an extrended length, for example, 10 to 20 mm. In this manner the inner bulb maintains its position both at and after fusion without external support, i.e., being held only by its rigid connection to the outer bulb. When the two bulbs are connected only at the fused constriction area, the inner bulb must be held by an expanded mandrel until the glass has completely solidified at the fusion region.

It is also preferable for the inner bulb to be blown with a groove and/or a bulge in the region of its open end. This is advantageous because glass rolls comfortably onto the bulge on the outside and is bonded with limited notch formation. The groove on the inside increases the hold of a stopper for the finished container.

The container mouth can, naturally, be designed differently as desired by proper formation or deformation of the inner bulb after fusion via a separate heat treatment.

A pump spigot can also be attached before or after joining of the bulbs, although preferably it is attached afterwards. The limited vacuum formed after cooling of the glass in an enclosed space is of no inconvenience and prevents any fouling of the inner surfaces thereof, which are eventually to be silvered.

The process of the invention may be used with the axes of the respective bulbs horizontal or vertical or at any angle therebetween.

Compared with the present state of the art, the invention provides the following advantages:
(1) Less operational steps are required so that the overall process is more economical.
(2) The individual operation steps are more easily mastered and controlled so that a better quality product is attained.

BRIEF DESCRIPTION OF THE DRAWINGS

FIG. 6 is a fragmentary sectional view showing the mouth of a finished container produced in accordance with the principles of the invention.

FIG. 7 is a fragmentary sectional view of an assembly of inner and outer bulbs useful in the practice of the invention and before the fusion of such bulbs; and FIG. 8 is a fragmentary sectional view of a finished mouth of a container produced from the assembly of FIG. 7 in accordance with the principles of the invention.

DESCRIPTION OF THE PREFERRED EMBODIMENT

Figure 1:
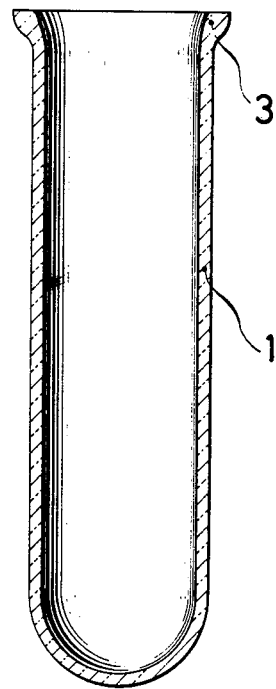
FIG. 1 is a vertical sectional view of an exemplary outer bulb as it comes off a blow-moulding machine.
Figure 2:
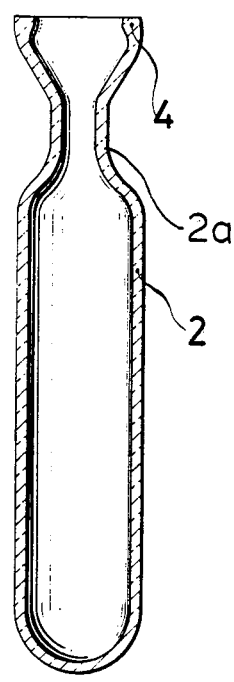
FIG. 2 is a vertical sectional view of an exemplary inner bulb as it comes off a blow-moulding machine.
Figure 3:
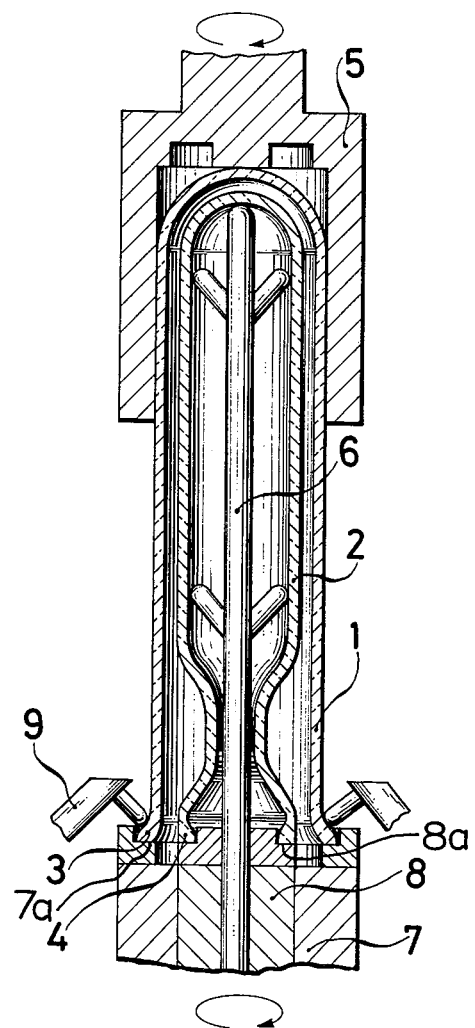
FIG. 3 is a partial sectional view illustrating assembled inner and outer bulbs mounted on an exemplary apparatus embodiment of the invention.
Figure 4:
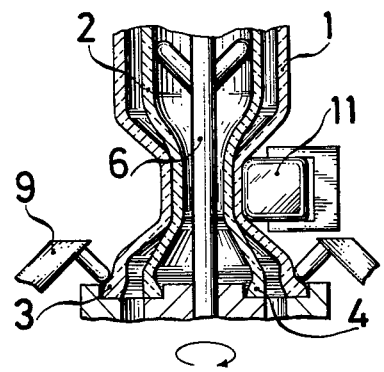
FIG. 4 is a fragmentary sectional view illustrating a deforming tool in contact with the an outer bulb during an operational process in accordance with the principles of the invention.

Referring to FIGS. 1 and 2, outer and inner glass bulbs 1 and 2, respectively, are produced on known blow-moulding machines and are then transferred to the apparatus of FIG. 3 for further processing in accordance with the principles of the invention. The outer bulb 1 has open end edges 3 and the inner bulb 2 has open end edges 4 and a neck or constricted portion 2a.

Figure 5:
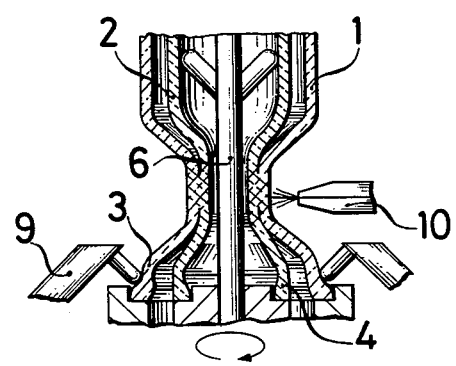
FIG. 5 is a fragmentary sectional view showing a heating means fusing areas of the bulbs together in accordance with the principles of the invention.

The apparatus of FIG. 3 includes a vacuum chuck means 5 and outer and inner chuck means 7 and 8 which are spaced from and face the vacuum chuck means 5. The chuck means 7 is axially moveable relative to the chuck means 8. The inner or first chuck means 8 includes an expandable mandrel means 6, which is shown in an expanded and extended condition in FIG. 3, but which can be contracted and withdrawn into the body of the chuck means 8 through a bore therein (not shown). The chuck means 8 also includes a support surface 8a for supporting the open end edges 4 of an inner bulb 2. The outer bulb 1 is clamped along the opposite end from its open end in the vacuum chuck means 5. With the mandrel means 6 in a contracted and withdrawn position, the inner bulb 2 is placed on the support surface 8a of the chuck means 8. The chuck means 7 and 8 and 5 are then brought together so that the inner bulb 2 is positioned within the outer bulb 1 and the mandrel means 6 is expanded and extended to assume the position shown at FIG. 3. Just before the open end edges 3 of the outer bulb 1 reach the support surface 7a of chuck means 7, the movement of the chuck means 7 is halted so as to leave a small gap, for example of about 1 to 2 mm between the open end edges 3 and the support surface 7a of the clamping chuck means 7. Gripping means 9 are then activated so as to move toward the support surface 7a and thereby engage and hold the open end edge 3 against such adjacent support surface 7a of the chuck means 7. During operation, the chuck means 5, 7 and 8 as well as any associated components, can be rotated in the same direction and about a common axis, as diagramatically indicated by the curved arrows. The outer bulb 1 is then heated by a heat source (not shown) until it becomes deformable or plastic and is then deformed at a region thereof above and adjacent the end edges 3 thereof by an inwardly moveable deforming tool 11 (FIG. 3) which deforms and compresses or stretches the heated region of the outer bulb 1 toward the adjacent surface portions of the inner bulb 2. After the deformation operation is completed, the heat means and deformation means are pivoted out of the way and a fusion means, such as a burner 10 (FIG. 5), is pivoted into position opposite the deformed region of bulb 1. The bulbs 1 and 2 are then substantially simultaneously fused together in the deform region of the bulb 1 and the end edges 3 and 4 of the respective bulbs as well as the wall portions between such edges and the fused region are pulled-off to define a mouth 16 (FIG. 6) which assumes a smoothly rounded profile as a result of the fusion operation. Adjacent the mouth 16 the container has a relatively thick wall portion 12, whose length can be increased or decreased according to choice. Where such length is required or desired to be approximately equal to the thickness of the glass in the region of the mouth 16, the expanded mandrel means 6 (FIG. 3) is maintained in position so as to support the inner bulb 2 for as long as it is necessary for the fused glass area to solidify. Where the length of the wall portion 12 is required to be longer, for example 10 to 20 mm or more, the inner bulb 2 is supported solely by the outer bulb and the mandrel means 6 is withdrawn into the clamping chuck means 8 as fusion commence, already before the clamping chucks 7 and 8 are lowered and the grippers means 9 moved out of operating position.

FIG. 7 shows an alternative construction in which an outer bulb 1b is deformed against an inner bulb 2b having an external bulge 14 along an upper portion of the neck or the constricted area 2a thereof. The area of contact between such bulbs is thus strongly rounded. The resultant container is shown in FIG. 8, wherein an internal annular groove 13 and an elongated thickened area 15 are provided adjacent the mouth of the container.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim as my invention:

1. An apparatus for producing a double-walled heat insulating container, comprising:
   a first clamping chuck means for supporting an open-ended inner bulb, said first chuck means having a support surface for the open end edges of said inner bulb and an expandable mandrel means axially moveable through a bore in said support surface to engage inner surface areas of said inner bulb;
   a second clamping chuck means for supporting an open-ended outer bulb, said second chuck means having a support surface for the open end edges of said outer bulb, said second chuck means support surface being arranged concentrically with the first chuck support surface;
   gripping means positioned away from said second chuck support surface and being pivotally moveable toward said second chuck support surface for gripping outer edge portions of the outer bulb adjacent the open end thereof against said second chuck support surface;
   a third clamping chuck means spaced apart from said first and second chuck means and coaxially aligned with said first and second chuck means for supporting said outer bulb on the opposite end from the open end thereof; and
   a heating-deforming means positioned between said third and said first and second chuck means and being selectively moveable at least toward and away from said first and second chuck means.

2. An apparatus as defined in claim 1 wherein said second chuck means is axially moveable relative to said first chuck means.

3. An apparatus as defined in claim 1 wherein said first, second and third chuck means are rotatable about a common axis.

4. An apparatus as defined in claim 1 wherein said heating-deforming means is moveable axially and radially.

5. An apparatus as defined in claim 1 wherein said heating-deforming means includes a forming tool for deforming portions of the outer bulb.

6. An apparatus as defined in claim 5 wherein said forming tool is moveable axially and radially.

7. An apparatus as defined in claim 1 wherein said heating-deforming means is rotatable about the common axis of said first, second and third chuck means.

8. An apparatus as defined in claim 1 wherein said heating-deforming means includes an independently moveable heating means and an independently moveable fusion means.

9. An apparatus as defined in claim 1 wherein said third chuck means comprises a vacuum chuck means.

* * * * *